United States Patent
McGavock, Jr. et al.

(10) Patent No.: US 11,430,318 B1
(45) Date of Patent: Aug. 30, 2022

(54) ELECTRICAL SURGE MANAGEMENT OF RAILWAY SIGNALING EQUIPMENT

(71) Applicant: Siemens Mobility, Inc., New York, NY (US)

(72) Inventors: Richard Alan McGavock, Jr., Columbia, MO (US); Brian Harp, New Albany, IN (US); John Sanders, Valparaiso, IN (US)

(73) Assignee: Siemens Mobility, Inc., New York, NY (US)

( * ) Notice: Subject to any disclaimer, the term of this patent is extended or adjusted under 35 U.S.C. 154(b) by 0 days.

(21) Appl. No.: 17/243,080

(22) Filed: Apr. 28, 2021

(51) Int. Cl.
*G01K 11/18* (2006.01)
*G08B 21/18* (2006.01)
*B61L 25/00* (2006.01)
*B61L 1/02* (2006.01)
*H02H 9/02* (2006.01)

(52) U.S. Cl.
CPC .............. *G08B 21/182* (2013.01); *B61L 1/02* (2013.01); *B61L 25/00* (2013.01); *H02H 9/02* (2013.01)

(58) Field of Classification Search
CPC ......... G08B 21/182; B61L 1/02; B61L 25/00; H02H 9/02
See application file for complete search history.

(56) References Cited

FOREIGN PATENT DOCUMENTS

| CN | 209561923 | * | 10/2019 |
| KR | 101850377 | * | 4/2018 |

* cited by examiner

*Primary Examiner* — Hongmin Fan (57) ABSTRACT

There is described systems and methods for managing an electrical surge of railway signaling equipment. A breaker includes a mechanical reset button that shifts positions in response to detecting the electrical surge exceeding a threshold amperage. An opto-isolator deenergizes in response to the position shift of the mechanical reset button. The event recorder transmits an alarm signal to a remote office system in response to the deenergizing of the opto-isolator.

20 Claims, 6 Drawing Sheets

ELECTRICAL SURGE MANAGEMENT OF RAILWAY SIGNALING EQUIPMENT

FIELD OF THE INVENTION

This application relates to the field of railway warning systems and, more particularly, to electrical surge management of rail crossing/signaling equipment.

BACKGROUND

Electrical surges can cause damage to crossing/signaling equipment of railway crossing that may cause a myriad of problems. These problems may affect the vitality of the equipment and go unnoticed for extended periods of time. Physical damage to surge arrestors or crossing/signaling products are often the only indication that a surge has occurred, and field forces may spend a considerable amount of time troubleshooting before the damage is discovered. A significant number of surges enter crossing/signaling equipment via track wires connected to the railroad tracks. Due to the vitality of those systems, standard surge detectors cannot be placed on these wires. They would create a single point of failure and have the potential for introducing electrical interference that may negatively affect the vital signal and crossing systems. The extensive time to identify and respond to electrical surges contributes to lesser public safety and increase labor costs within the rail industry.

SUMMARY

In accordance with one embodiment of the disclosure, there is provided a mechanically isolated surge management approach for railway signaling equipment. In particular, a system and method for electrical surge management may inform a central office system that an electrical surge has occurred while remaining isolated from the track wires and not creating a single point of failure by design.

One aspect is an electrical surge management system of railway signaling equipment comprising a breaker coupled to a track wire, an opto-isolator substantially adjacent to the breaker, and an event recorder coupled to the opto-isolator. The breaker includes a mechanical reset button that shifts from a first position to a second position in response to detecting an electrical surge of the track wire exceeding a threshold amperage of the breaker. The opto-isolator deenergizes in response to shifting the mechanical reset button of the breaker from the first position to the second position. The event recorder transmits an alarm signal to a central office system located remote from the event recorder in response to deenergizing the opto-isolator.

Another aspect is a method for managing an electrical surge of railway signaling equipment. A breaker detects an electrical surge of a track wire coupled to the breaker exceeding a threshold amperage. A mechanical reset button of the breaker shifts from a first position to a second position in response to detecting the electrical surge of the track wire. An opto-isolator deenergizes in response to shifting the mechanical reset button of the breaker from the first position to the second position. An event recorder transmits an alarm signal to a central office system located remote from the event recorder in response to deenergizing the opto-isolator.

Yet another aspect is a non-transitory computer readable medium including executable instructions which, when executed, causes at least one processor to manage an electrical surge of railway signaling equipment. An electrical surge of a track wire exceeding a threshold amperage is detected. A mechanical reset button of a breaker shifts from a first position to a second position in response to detecting the electrical surge of the track wire. An opto-isolator deenergizes in response to shifting the mechanical reset button of the breaker from the first position to the second position. An alarm signal is transmitted in response to deenergizing the opto-isolator.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Various technologies that pertain to systems and methods that facilitate mechanically isolated surge management for railway signaling equipment will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Figure 1:
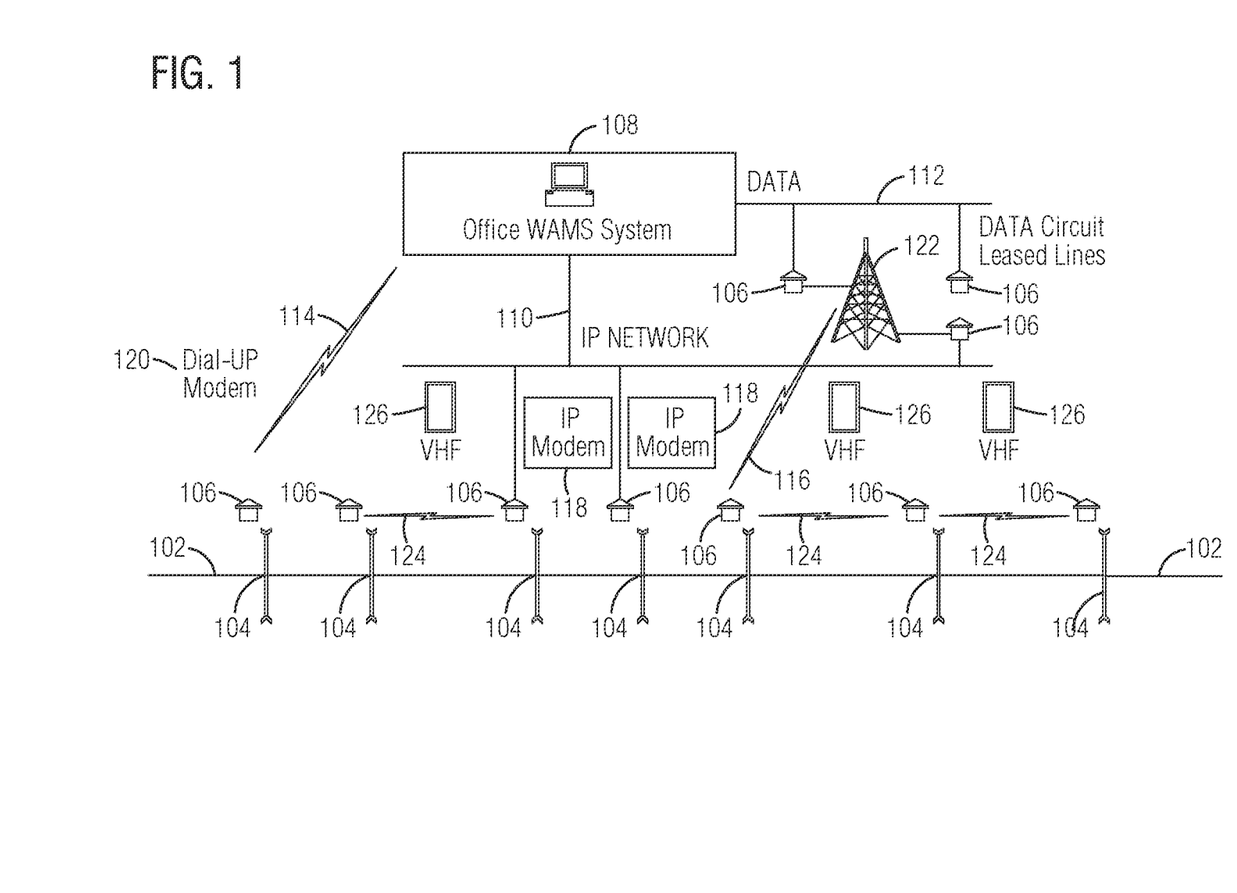
FIG. 1 is an illustration of an environment in an example implementation that is operable to employ techniques described herein.

Referring to FIG. 1, there is shown an illustration of a railway signaling system 100 in an example implementation that is operable to employ techniques described herein. The railway signaling system 100 includes a track wire 102 co-located with a railway track, rail crossings 104 positioned at various locations along the railway track, and wayside equipment 106, such as grade crossing predictors ("GCPs"), positioned at various locations along the railway track often co-inciding with the rail crossings 104 and/or bungalows. The railway signaling system 100 also includes a central office system 108 having a wayside alarm management system ("WAMS") that communicates with other wayside equipment 106, such as GCPs, or other locations proximal to the track wire 102. The WAMS includes administration process systems, management process systems, databases, and communication systems, and the WAMS allows railroad-wide monitoring of event recorders at rail locations, such as grade crossings, intermediate points, and control points. Further operations of the WAMS may include one or more of the following: retrieval of event logs from locations, remote access to recorders, management of inspections, and management of incidents.

Wayside equipment 106, such as GCPs, communicate with the central office system 108, particularly the WAMS, in one or more ways. Wayside equipment 106 may communicate with the central office system 108 via a wired connection 110, 112, via a wireless connection 114, and/or a combination of wired and wireless connections 116. An example of a wired connection 110, 112 may include, but is not be limited to, an IP network 110 or other data network 112, facilitated by an IP modem 118 or other data communication device. An example of a wireless connection 114 may include, but is not be limited to, a cellular modem direct connection 120. An example of a combination of wired and wireless connections 116 may include, but is not limited to, a cellular link to a cell tower 122 and a data network 112. Wayside equipment 106 may also communicate with each other via radio communications 124, such as a very high frequency ("VHF") communicator 126.

Figure 2:
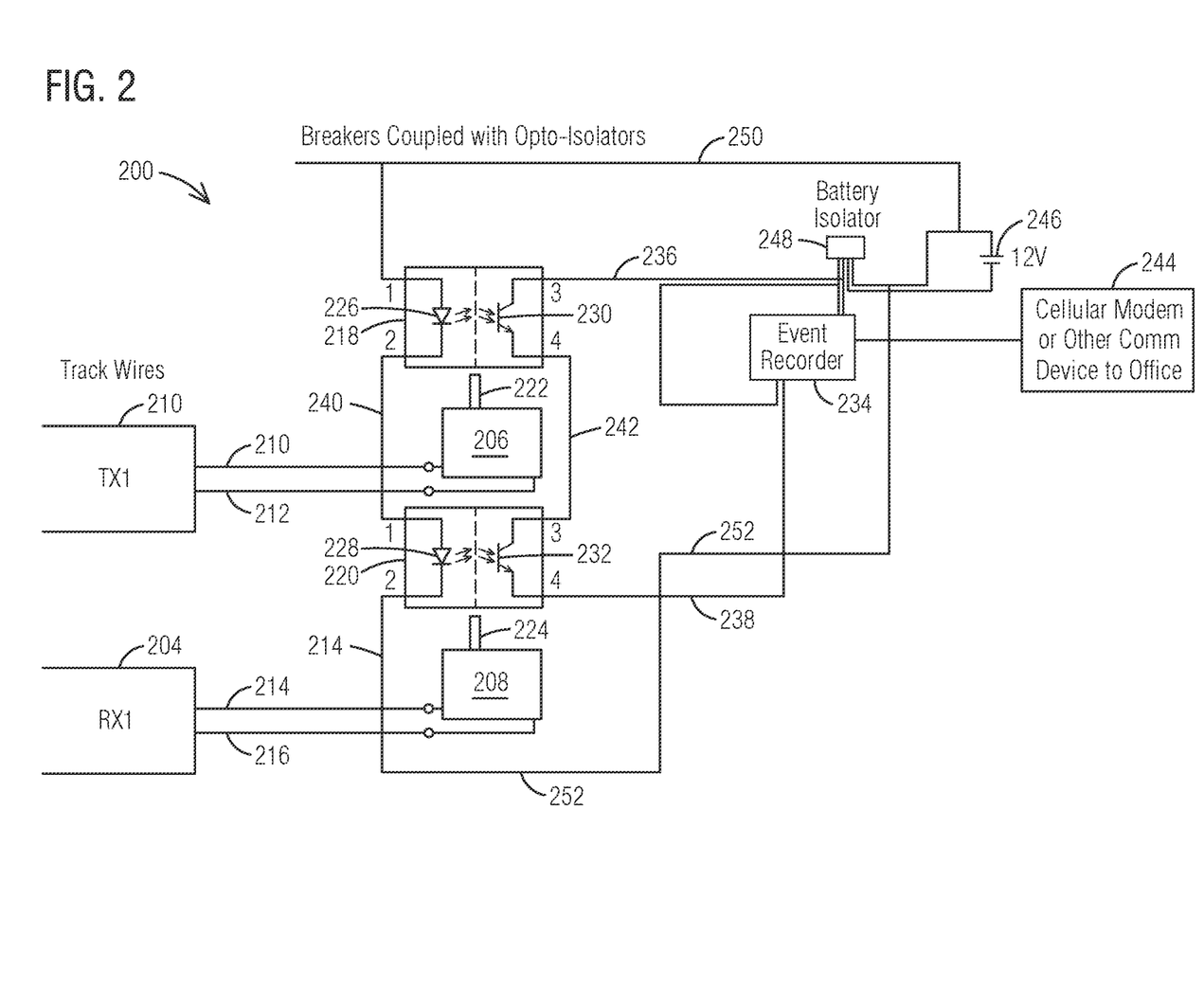
FIG. 2 depicts an example implementation of surge detection units for detecting and reporting electrical surges of track wires to a central office system.

Referring to FIG. 2, there is shown an example implementation of surge detection units of railway signaling equipment 200 for detecting and reporting electrical surges of track wires to a central office system. The surge detection units are coupled to track wires 202, 204 corresponding to one or more railway tracks. Each surge detection unit includes a breaker 206, 208 coupled to a corresponding track wire 210, 212, 214, 216, and an opto-isolator 218, 220 substantially adjacent to the corresponding breaker 206, 208. Each breaker 206, 208 includes a mechanical reset button 222, 224 that shifts positions in response to detecting an electrical surge of the track wire 202, 204 exceeding a threshold amperage of the corresponding breaker. Each opto-isolator 218, 220 that corresponds to a breaker 206, 208 detecting an electrical surge deenergizes in response to shifting the mechanical reset button 222, 224 of the breaker from a first position to a second position.

For some embodiments, each opto-isolator 218, 220 may include a light source 226, 228 and a light detector 230, 232, and the mechanical reset button 222, 224 blocks the light path of the opto-isolator 218, 220 by being positioned between the light source 226, 228 and the light detector 230, 232 of the opto-isolator. An event recorder 234 is coupled the opto-isolators 218, 220 via first interconnecting lines 236, 238. The mechanical reset button 222, 224 of the breaker 206, 208 may be reset or returned to the first position subsequent to the event recorder 234 performing one or more actions as a result of the shift of the mechanical reset button to the second position.

The railway signaling equipment 200 may include a single surge detection unit or multiple surge detection units. As shown by example in FIG. 2, multiple opto-isolators 218, 220 may be wired in series via intraconnecting lines 240, 242. In particular, an output of a first opto-isolator 218 may be wired in series with an input of a second opto-isolator 220. The event recorder 234 transmits an alarm signal in response to deenergizing the first opto-isolator 218, the second opto-isolators 218, or both opto-isolators. For this multiple opto-isolator configuration, an input of the event recorder 234 will deenergize should any one of the opto-isolators 218, 220 drop so that wiring and recorder input usage may be minimized.

Once onsite, field personnel may physically view the reset buttons on the mechanically isolated surge detection units to determine which track wires have experienced an electrical surge. The field personnel may then manually shift the mechanical reset button on any tripped mechanically isolated surge detection units. For some embodiments, the field personnel may also replace any damaged components of the surge detection unit, if possible, while onsite with the unit.

Each opto-isolator 218, 220 may be deenergized, thus causing a corresponding digital input of the event recorder 234 to deenergize. The event recorder 234 may then transmit an alarm signal to a central office system 108 (shown in FIG. 1) located remote from the event recorder in response to deenergizing one or more of the opto-isolators 218, 220. The alarm signal may provide an indication to the central office system 108 about the electrical surge of the track wire 202, 204. The event recorder 234 may transmit the alarm signal to the central office system 244 via wired or wireless communication link 244. For example, the event recorder 243 may send the alarm signal to the central office system 108 via cell modem or other communication path, indicating that the electrical surge has occurred at that location. Each opto-isolator 218, 220 is capable of deenergizing in response to the mechanical reset button 222, 224 of the corresponding breaker 206, 208 blocking a light path of the opto-isolator when the mechanical reset button is at the second position. An input of the event recorder 234 deenergizes in response to the opto-isolator 218, 220 deenergizing, and the alarm signal is transmitted in response to the event recorder input deenergizing.

The railway signaling equipment 200 may further include a power source 246 and a power circuit 248 to manage the power source 246 for the event recorder 234. The power source 246 may also provide energy to each opto-isolator 218, 220 via second interconnecting lines 250, 252. For embodiments in which multiple opto-isolators 218, 220 connected in series, the power source 246 may be coupled to the series of opto-isolators.

Figure 3A:
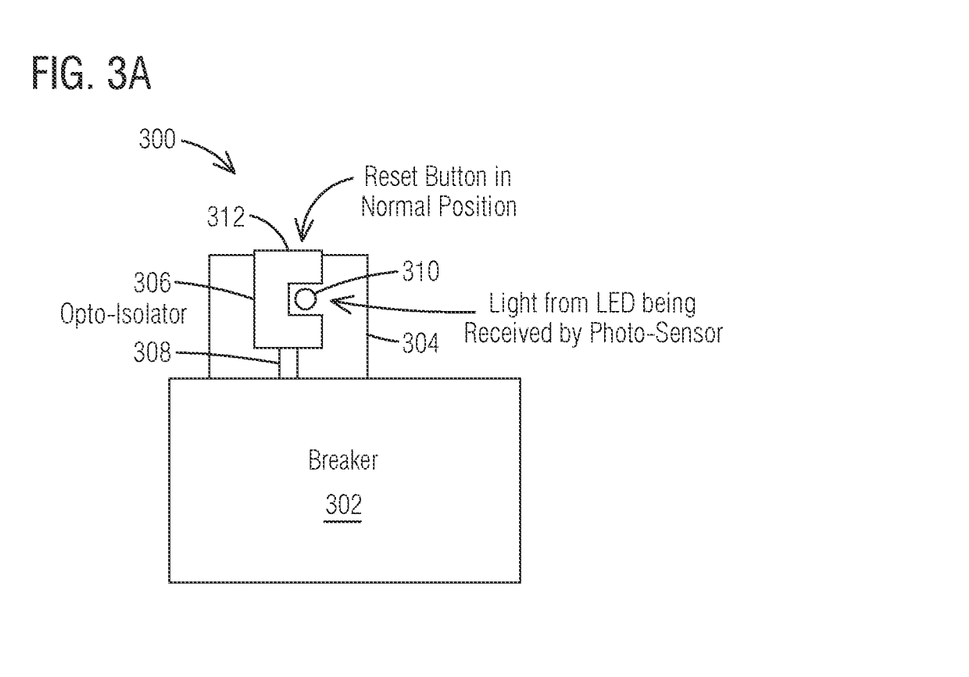
FIGS. 3A and 3B depict example operational modes of a particular surge detection unit of FIG. 2 including a breaker and corresponding opto-isolator.
Figure 3B:
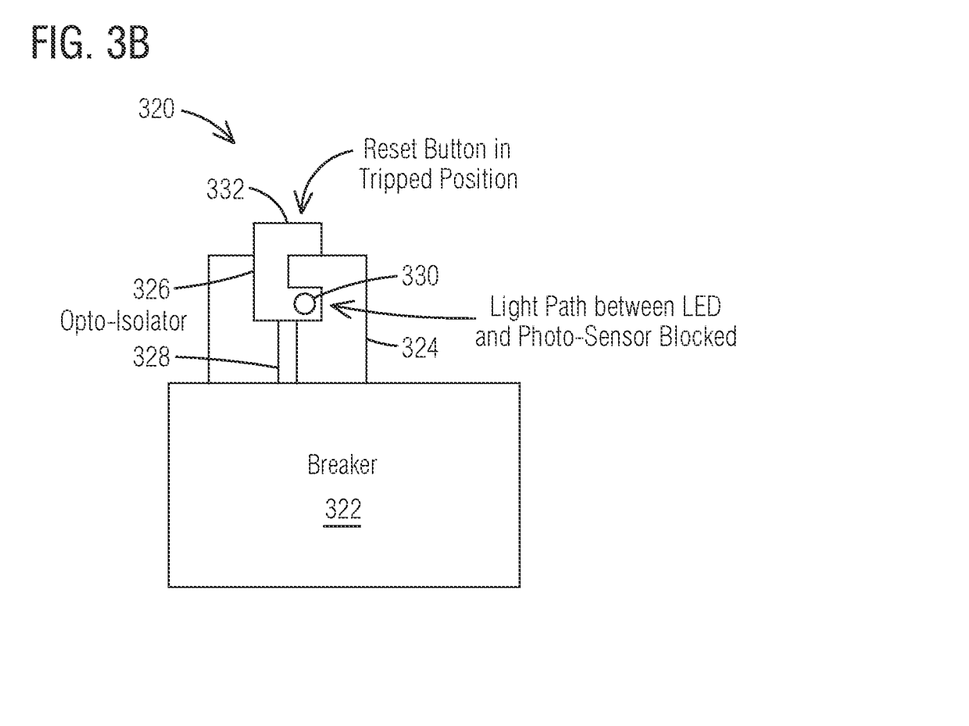

Referring to FIGS. 3A and 3B. there are depicted example operational modes 300, 320 of a particular surge detection unit. Referring specifically to FIG. 3A, a first operational mode 300 illustrates a surge detection unit including a breaker 302 and corresponding opto-isolator 304. The opto-isolator 304 may be adjacent to the breaker 302 or otherwise located in proximity to the breaker. The breaker 302 includes a mechanical reset button 306 extending from one side of the breaker in the direction of the opto-isolator 304. For some embodiments, the mechanical reset button 306 may include a mechanical arm 308 to extend and retract a position of the reset button relative to the breaker 302. The mechanical reset button 306 shifts from the first position represented by FIG. 3A to a second position represented by FIG. 3B in response to detecting an electrical surge of the track wire exceeding a threshold amperage of the breaker. The opto-isolator 304 includes a light path 310 that transcends between two components of the opto-isolator, such as a light source 226, 228 and a light detector 230, 232 (shown in FIG. 2). At the first position, the mechanical reset button 306 includes a passage that avoids obstructing the light path 310 of the opto-isolator 304 from passing between the two components.

For some embodiments, the mechanical reset button 306 also includes a visual indicator 312 to provide any field personnel an indication that an electrical surge has been detected by the breaker 302. For some embodiments, the visual indicator may be a portion of the mechanical reset button 306 having a non-extending position that corresponds to the first position of the reset button. For example, as shown in FIG. 3A, the visual indicator may be a substantially planar surface that is substantially flush with an outer surface of the opto-isolator 304 when the opto-isolator is at the first position.

Referring specifically to FIG. 3B, a second operational mode 320 illustrates the surge detection unit with the breaker 322 and corresponding opto-isolator 324. The second operational mode 320 represents a second position of the mechanical reset button 326 that is different from the first position represented by the first operational mode 300. For some embodiments, the mechanical reset button 326 extends further from the one side of the breaker, in the direction of the opto-isolator 304, than the first position. For example, the mechanical arm 328 may extend the position of the mechanical reset button 326 to the second position in response to detecting an electrical surge of the track wire exceeding a threshold amperage of the breaker. The mechanical reset button 326 blocks the light path 330 of the opto-isolator 324 when the mechanical reset button is at the second position. For embodiments that include the visual indicator 332, the visual indicator may be at an extended position that corresponds to the second position of the reset button 326. For example, as shown in FIG. 3B, the visual indicator 332 extends beyond outer surface of the opto-isolator 324 when the opto-isolator is at the second position.

At the second position, the mechanical reset button 326 includes a blocking component 334 that obstructs the light path 330 from passing between the two light components of the opto-isolator 324. For some embodiments, the blocking component 334 may be a portion of the mechanical reset button 326 that is different from the visual indicator of the reset button. For example, the blocking component 334 may be a portion of the mechanical reset button 326 that is opposite the visual indicator 332. Should an electrical surge occur beyond the rated amperage of the breaker 322, the breaker may trip and the mechanical reset button 326 may be extended, thus breaking the light path of an opto-isolator 324 paired with the breaker. The opto-isolator 324 may then be deenergized, thus causing a corresponding event recorder digital input to deenergize. The event recorder 234 may then send an alarm signal to a central office system 108 indicating that the surge has occurred at that location.

Figure 4:
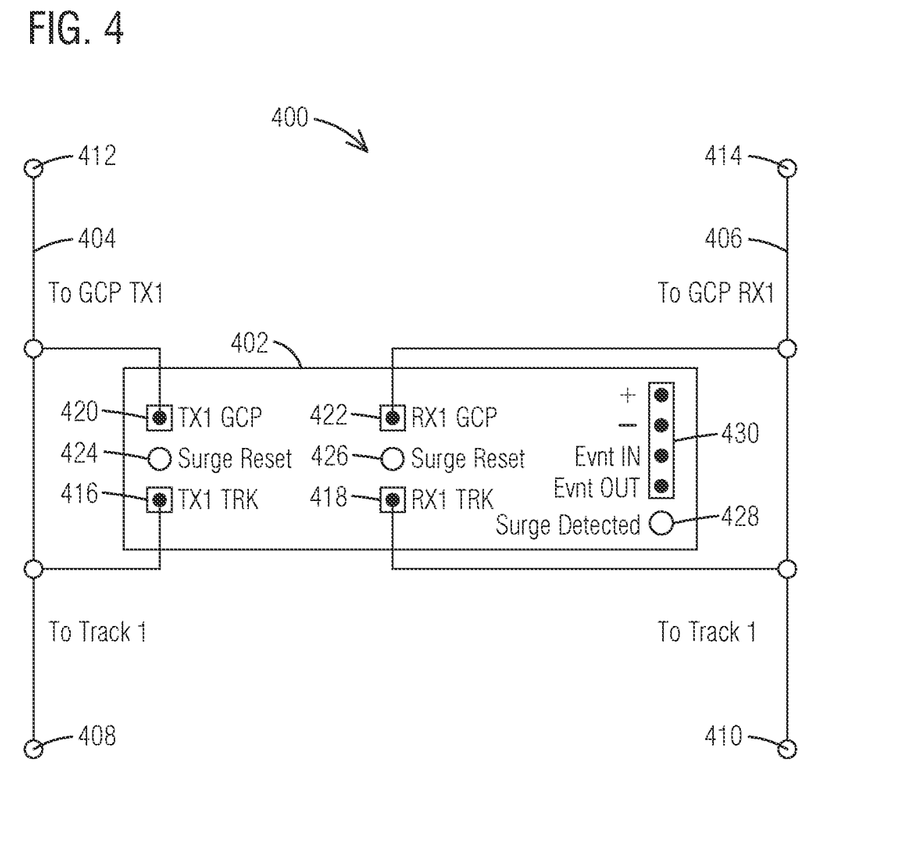
FIG. 4 depicts an example implementation of the surge detection unit, represented by FIGS. 3A and 3B, for a single track installation.

Referring to FIG. 4, there is depicted an example implementation 400 of a breaker 402 of the surge detection unit that is mechanically isolated for a single track installation. The breaker 402 is configured in parallel with the track wire 404, 406. The frequency output by the crossing/signaling system may normally pass through the breaker 402 as it will be the least resistive path and, for some embodiments, additional track wire length may be added in parallel to ensure this feature. Track ends 408, 410 of the track wire 404, 406 are coupled to railway components associated with the railway track, and equipment ends 412, 414 of the track wire are coupled to wayside equipment 106 (shown in FIG. 1), such as a grade crossing predictors ("GCP"). The track ends 408, 410 may be coupled to transmit and receive track terminals 416, 418 of the breaker 402, and the equipment ends 412, 414 may be coupled to the transmit and receive equipment terminals 420, 422 of the breaker. The breaker 402 has one or more breaker indicators 424, 426, 428, including at least one mechanical reset button. For example, the breaker 402 may include multiple mechanical reset buttons 424, 426 in accordance with the reset buttons described above for the surge detection units. For some embodiments, the breaker 402 may include one or more additional visual indicators 428 to represent detection of an electrical surge.

For some embodiments, the breaker 402 may also include one or more auxiliary electrical terminals 430 for a power connection to a power source 246 and/or an event connection to an event recorder 234 as described above in reference to FIG. 2. For example, if any of the reset buttons 424, 426 (i.e., "surge resets") of the breaker 402 are popped out of the breaker, then the breaker has tripped and thus blocks the light path of the paired or corresponding opto-isolator. In turn, at voltage at the EVNT OUT terminal of the auxiliary electrical terminals 430 drops for the event recorder input and triggers the alarm signal to the central office system, if available or at a minimum logging the surge detection time. The mechanical reset button or buttons 424, 426 may be reset may pressing them back in the breaker. As a result, the light path of the opto-isolator is restored, and the EVNT OUT voltage is set high again.

Figure 5:
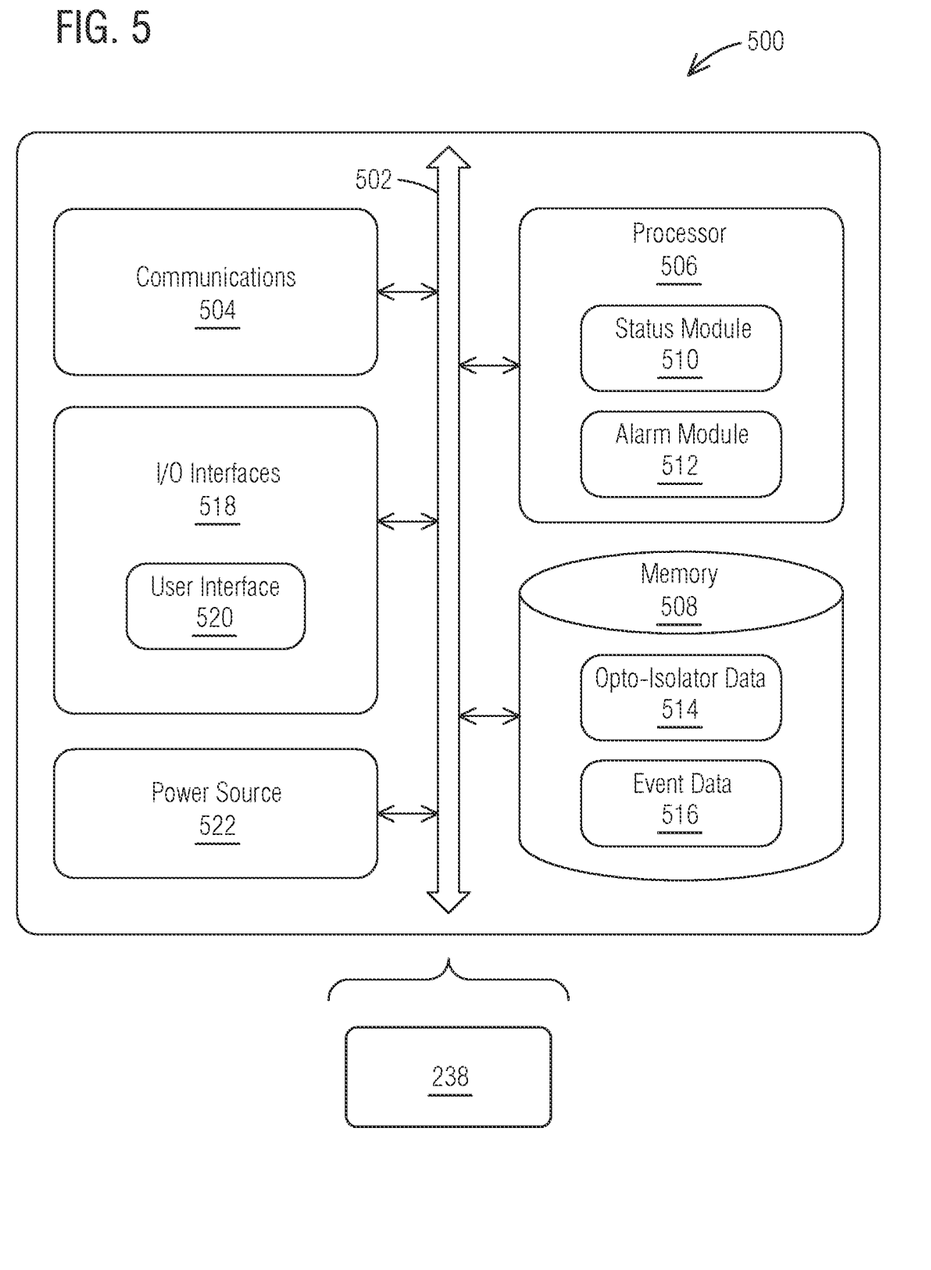
FIG. 5 is a block diagram of an example implementation of an event recorder of FIG. 2.

FIG. 5 represents an example event recorder 500 of railway signaling equipment 200. The event recorder 500 comprises a communication bus 502 for interconnecting the other device components directly or indirectly, one or more communication components 504 communicating other entities via a wired and/or wireless network, one or more processors 506, and one or more memory components 508. The communication component 504 may utilize wired or wireless technology for communication with opto-isolators, wayside equipment, and other devices of the railway signaling system 100.

The one or more processors 506 may execute code and process data received at other components of the event recorder 500, such as information received at the communication component 504 or stored at the memory component 508. The code associated with the railway signaling equipment 200 and stored by the memory component 508 may include, but is not limited to, operating systems, applications, modules, drivers, and the like. An operating system includes executable code that controls basic functions of the event recorder 500, such as interactions among the various components of the event recorder, communication with external devices via the communication component 504, and storage and retrieval of code and data to and from the memory component 508. Each application includes executable code to provide specific functionality for the processor 506 and/or remaining components of the event recorder 500. Examples of applications executable by the processor 506 include, but are not limited to, an opto-isolator status module 510 for detecting that one or more opto-isolators have been deenergized and an alarm module 512 for sending the alarm signal to the central office system. Data is information that may be referenced and/or manipulated by an operating system or application for performing functions of the event recorder 500. Examples of data stored by the memory component 508 may include, but are not limited to, opto-isolator data 514 for tracking the status of one or more opto-isolators and event data 516 for managing alarm events of the opto-isolators that are provided to the central office system.

The event recorder 500 may further comprise one or more input and/or output components 518 ("I/O interfaces"). A user interface 520 of the event recorder 500 may include portions of the input and/or output components 518 and be used to interact with a user of the event recorder. The event recorder 500 may further comprise a power source 522, such as a power supply or a portable battery, for providing power to the other device components of the event recorder 500.

It is to be understood that FIG. 5 is provided for illustrative purposes only to represent examples of the internal components of the event recorder 500 and is not intended to be a complete diagram of the various components that may be utilized by the device. Therefore, the event recorder 500 may include various other components not shown in FIG. 5, may include a combination of two or more components, or a division of a particular component into two or more separate components, and still be within the scope of the present invention.

Figure 6:
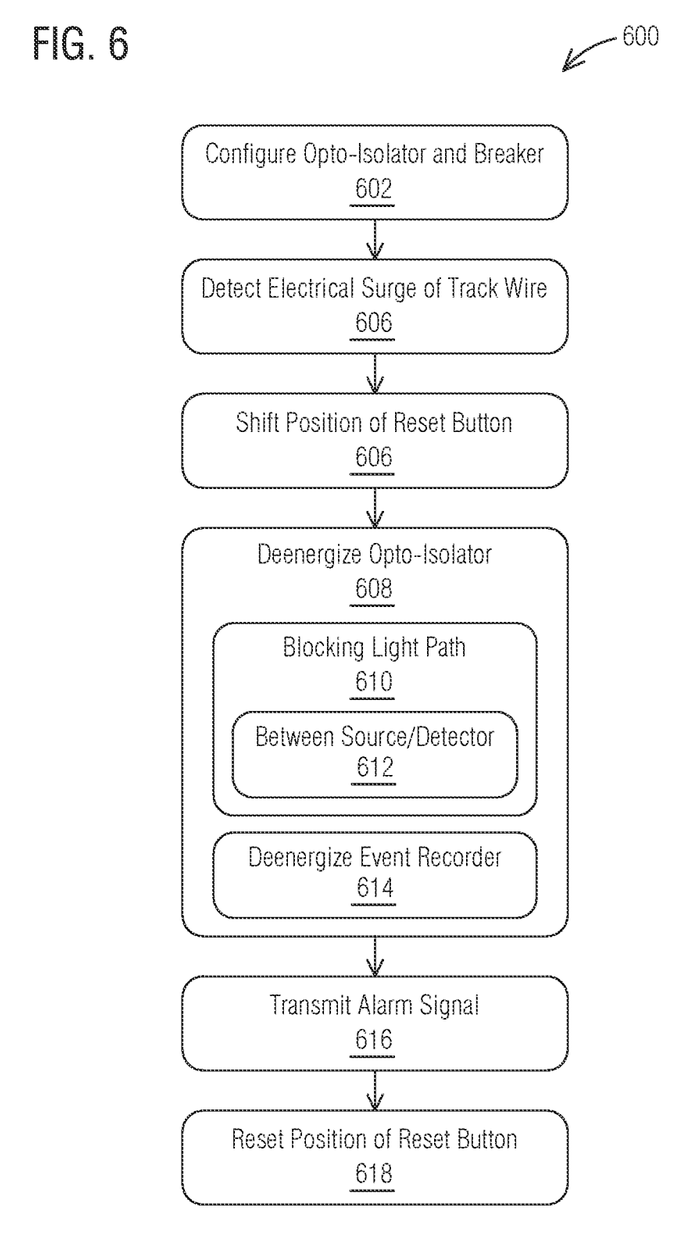
FIG. 6 is a flow diagram of an example operation of the railway signaling equipment of FIG. 2.

Referring to FIG. 6, there is a flow diagram of an example operation 600 of railway signaling equipment 200 (shown in FIG. 2) to manage an electrical surge of the equipment. The opto-isolator 218, 220 and breaker 206, 208 of each surge detection unit may be configured (602) to operate in conjunction with other devices of the railway signaling equipment 200. For example, the breaker 206, 208 may be configured in parallel with the track wire 202, 204 and rail signaling may normally passes through the breaker. After configuring the opto-isolators 218, 220 and breakers 206, 208, the surge detections units may be activated for mechanically isolated surge detection. During operation, a breaker 206, 208 detects an electrical surge of a track wire 202, 204 coupled to the breaker that exceeds a threshold amperage of the breaker (604). The breaker 206, 208 shifts a mechanical reset button 222, 224 of the breaker from a first position to a second position (606) in response to detecting the electrical surge of the track wire 202, 204.

In response to shifting the position of the mechanical reset button (606), the paired or corresponding opto-isolator 218, 220 adjacent to, or otherwise proximal to the breaker 206, 208, deenergizes (608). In deenergizing the opto-isolator 218, 220 (608), the mechanical reset button moves from the first position to the second position, thus blocking the light path of the opto-isolator 218, 220 (610). For some embodiments, the light path of the opto-isolator 218, 220 is blocked by positioning the mechanical reset button 222, 224 between a light source and a light detector of the opto-isolator (612).

The event recorder that is coupled to the opto-isolator transmits the alarm signal to the central office system located remote from the event recorder in response to deenergizing the opto-isolator (616). The input of the event recorder 234 is deenergized in response to deenergizing the opto-isolator 218, 220 (614). The alarm signal, which indicates the electrical surge of the track wire 202, 204, may be transmitted to the central office system via wired or wireless communication link. For some embodiments, the alarm signal is transmitted in response to deenergizing the event recorder input. For some embodiments, the railway signaling equipment 200 includes multiple opto-isolators 218, 220, so a first opto-isolator 218 may be coupled in series with a second opto-isolator 220. In such configuration, the alarm signal may be transmitted in response to deenergizing one or both of the first and second opto-isolators 218, 220. The mechanical reset button 222, 224 of the breaker 206, 208 may be reset from the second position back to the first position subsequent to transmitting the alarm signal to the central office system (618).

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. An electrical surge management system of railway signaling equipment comprising:
   a breaker coupled to a track wire, the breaker including a mechanical reset button that shifts from a first position to a second position in response to detecting an electrical surge of the track wire exceeding a threshold amperage of the breaker;
   an opto-isolator substantially adjacent to the breaker, the opto-isolator deenergizing in response to the shifting the mechanical reset button of the breaker from the first position to the second position; and
   an event recorder coupled the opto-isolator, the event recorder transmitting an alarm signal to a central office system located remote from the event recorder in response to deenergizing the opto-isolator.

2. The electrical surge management system as described in claim 1, wherein the breaker is configured in parallel with the track wire and rail signaling normally passes through the breaker.

3. The electrical surge management system as described in claim 1, wherein:
   the opto-isolator deenergizes in response to the mechanical reset button blocking a light path of the opto-isolator when the mechanical reset button is at the second position;
   an event recorder input deenergizes in response to the opto-isolator deenergizing; and
   the alarm signal is transmitted in response to the event recorder input deenergizing.

4. The electrical surge management system as described in claim 3, wherein:

the opto-isolator includes a light source and a light detector; and the mechanical reset button blocks the light path of the opto-isolator by being positioned between the light source and the light detector of the opto-isolator.

5. The electrical surge management system as described in claim 1, further comprising a second opto-isolator wherein:

the opto-isolator is a first opto-isolator;

the second opto-isolator is wired in series with the first opto-isolator; and the event recorder transmits the alarm signal in response to at least one of the first or second opto-isolators deenergizing.

6. The electrical surge management system as described in claim 1, wherein:

the event recorder transmits the alarm signal to the central office system via wired or wireless communication link; and the alarm signal indicates the electrical surge of the track wire.

7. The electrical surge management system as described in claim 1, wherein the mechanical reset button of the breaker is reset from the second position to the first position subsequent to the event recorder transmitting the alarm signal to the central office system.

8. A method for managing an electrical surge of railway signaling equipment, the method comprising:

detecting, by a breaker, an electrical surge of a track wire coupled to the breaker exceeding a threshold amperage;

shifting a mechanical reset button of the breaker from a first position to a second position in response to detecting the electrical surge of the track wire;

deenergizing an opto-isolator in response to the shifting the mechanical reset button of the breaker from the first position to the second position; and transmitting, by an event recorder coupled to the opto-isolator, an alarm signal to a central office system located remote from the event recorder in response to deenergizing the opto-isolator.

9. The method as described in claim 8, further comprising configuring the breaker in parallel with the track wire, wherein rail signaling normally passes through the breaker.

10. The method as described in claim 8, wherein:

deenergizing the opto-isolator includes blocking a light path of the opto-isolator when the mechanical reset button is at the second position and deenergizing an event recorder input in response to deenergizing the opto-isolator; and transmitting the alarm signal in response to deenergizing the opto-isolator includes transmitting the alarm sign in response to deenergizing the event recorder input.

11. The method as described in claim 10, wherein blocking the light path of the opto-isolator includes positioning the mechanical reset button between a light source and a light detector of the opto-isolator.

12. The method as described in claim 8, wherein:

the opto-isolator is a first opto-isolator coupled in series with a second opto-isolator; and transmitting the alarm signal in response to deenergizing the opto-isolator includes transmitting the alarm signal in response to deenergizing at least one of the first and second opto-isolators.

13. The method as described in claim 8, wherein:

transmitting the alarm signal includes transmitting the alarm system to the central office system via wired or wireless communication link; and the alarm signal indicates the electrical surge of the track wire.

14. The method as described in claim 8, further comprising resetting the mechanical reset button of the breaker from the second position to the first position subsequent to transmitting the alarm signal to the central office system.

15. A non-transitory computer readable medium including executable instructions which, when executed, causes at least one processor to manage an electrical surge of railway signaling equipment by:

detecting an electrical surge of a track wire exceeding a threshold amperage;

shifting a mechanical reset button of a breaker from a first position to a second position in response to detecting the electrical surge of the track wire;

deenergizing an opto-isolator in response to the shifting the mechanical reset button of the breaker from the first position to the second position; and transmitting an alarm signal in response to deenergizing the opto-isolator.

16. The medium as described in claim 15, wherein:

deenergizing the opto-isolator includes blocking a light path of the opto-isolator when the mechanical reset button is at the second position and deenergizing an event recorder input in response to deenergizing the opto-isolator; and transmitting the alarm signal in response to deenergizing the opto-isolator includes transmitting the alarm sign in response to deenergizing the event recorder input.

17. The medium as described in claim 16, wherein blocking the light path of the opto-isolator includes positioning the mechanical reset button between a light source and a light detector of the opto-isolator.

18. The medium as described in claim 15, wherein:

the opto-isolator is a first opto-isolator coupled in series with a second opto-isolator; and transmitting the alarm signal in response to deenergizing the opto-isolator includes transmitting the alarm signal in response to deenergizing at least one of the first and second opto-isolators.

19. The medium as described in claim 15, wherein:

transmitting the alarm signal includes transmitting the alarm system via wired or wireless communication link; and the alarm signal indicates the electrical surge of the track wire.

20. The medium as described in claim 15, further comprising resetting the mechanical reset button of the breaker from the second position to the first position subsequent to transmitting the alarm signal.

* * * * *